United States Patent [19]

Morrison et al.

[11] Patent Number: 5,371,811
[45] Date of Patent: Dec. 6, 1994

[54] DATA ENCODING

[75] Inventors: David G. Morrison; Andrew P. Heron, both of Ipswich, England

[73] Assignee: British Telecommunications public limited company, London, England

[21] Appl. No.: 995,928

[22] Filed: Dec. 23, 1992

Related U.S. Application Data

[63] Continuation of Ser. No. 657,266, Feb. 19, 1991, abandoned, which is a continuation of Ser. No. 326,663, Mar. 3, 1989, abandoned.

[30] Foreign Application Priority Data

Jul. 9, 1987 [GB] United Kingdom ................. 8716195

[51] Int. Cl.$^5$ .............................................. G06K 9/36
[52] U.S. Cl. ........................................ 382/56; 382/44; 348/411
[58] Field of Search ............................ 382/56, 44, 45; 358/430, 433, 133, 261.3; 348/397, 400, 411; H04N 1/415, 7/12

[56] References Cited

U.S. PATENT DOCUMENTS

| | | | |
|---|---|---|---|
| 4,394,774 | 7/1983 | Widergren et al. | 382/56 |
| 4,454,546 | 6/1984 | Mori | 358/133 |
| 4,517,596 | 5/1985 | Suzuki | 358/133 |
| 4,580,162 | 4/1986 | Mori | 358/135 |
| 4,694,336 | 9/1987 | Keesen et al. | 358/133 |
| 4,727,421 | 2/1988 | Koga | 358/133 |
| 4,734,767 | 3/1988 | Kaneko et al. | 358/133 |
| 4,757,383 | 7/1988 | Tanaka | 358/133 |
| 4,792,981 | 12/1988 | Cahill, III et al. | 358/261.3 |
| 4,827,338 | 5/1989 | Gerard | 358/133 |
| 4,908,862 | 3/1990 | Kankeo et al. | 380/28 |
| 4,920,414 | 4/1990 | Remus et al. | 382/56 |

FOREIGN PATENT DOCUMENTS

| | | |
|---|---|---|
| 0103380 | 3/1984 | European Pat. Off. . |
| 0180345 | 5/1986 | European Pat. Off. . |
| 0267578 | 5/1988 | European Pat. Off. . |
| 2173067 | 10/1986 | United Kingdom . |

OTHER PUBLICATIONS

IEEE International Conference on Communications, 14th–18th Jun., 1981, vol. 2, IEEE (New York, US) A. Jalali et al: "An architecture for hybrid coding of NTSC TV sigals", pp. 22.4.1–22.4.5.

Japan Telecommunications Review, vol. 21. No. 2, Apr. 1979, M. Mizui et al: "Commercialized interframe CODEC for NTSC color video signals", pp. 109–117.

International Conference on Communications, Denver, Colo.—Jun. 14–18, 1981 Conference Record, vol. 2 of 4, 2 pages.

IEEE International Conference on Communications, 22–25 Jun. 1986, Toronto, Calif., vol. 1, IEEE, (New York, US), J. Guichard et al: "intra and interframe transform coding for moving pictures transmission", pp. 381–384.

WO, A, 87/02854, Eude "Method for Hybrid Coding by Transformation for the Transmission of Image Signal", May, 1987.

IEEE Global Telecommunications Conference, 1–4 Dec. 1986, M. Ohta et al "Adaptive UWL coding of transform coefficients for sub-primary rate video transmission", pp. 271–275.

IEEE Transaction on Acoustics, Speech, and Signal Processing, Feb. 1984, K. N. Ngan "Image display techniques using the cosine transform" pp. 173–177.

Primary Examiner—Yon J. Couso
Attorney, Agent, or Firm—Nixon & Vanderhye

[57] ABSTRACT

Values, such as a set of coefficients in a transform-based video coder are to be transmitted sequentially in any one of a number of possible preset orders. The order to be selected is the one that results in the largest number of consecutive zeros (or low values) at the end of the sequence. Values are supplied (in an arbitrary sequence) with addresses, in parallel to a bank of assessment sections—one for each preset order—each of which translates the addresses into addresses representing a position in the respective order and records the highest for which the associated value is non-zero. The outputs of the sections are then compared to identify the lowest, and hence the optimum order of transmission.

10 Claims, 3 Drawing Sheets

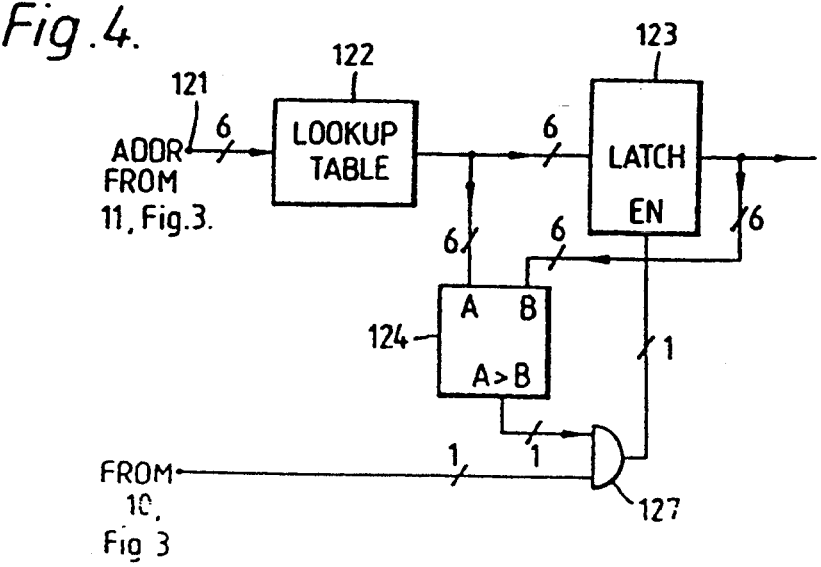
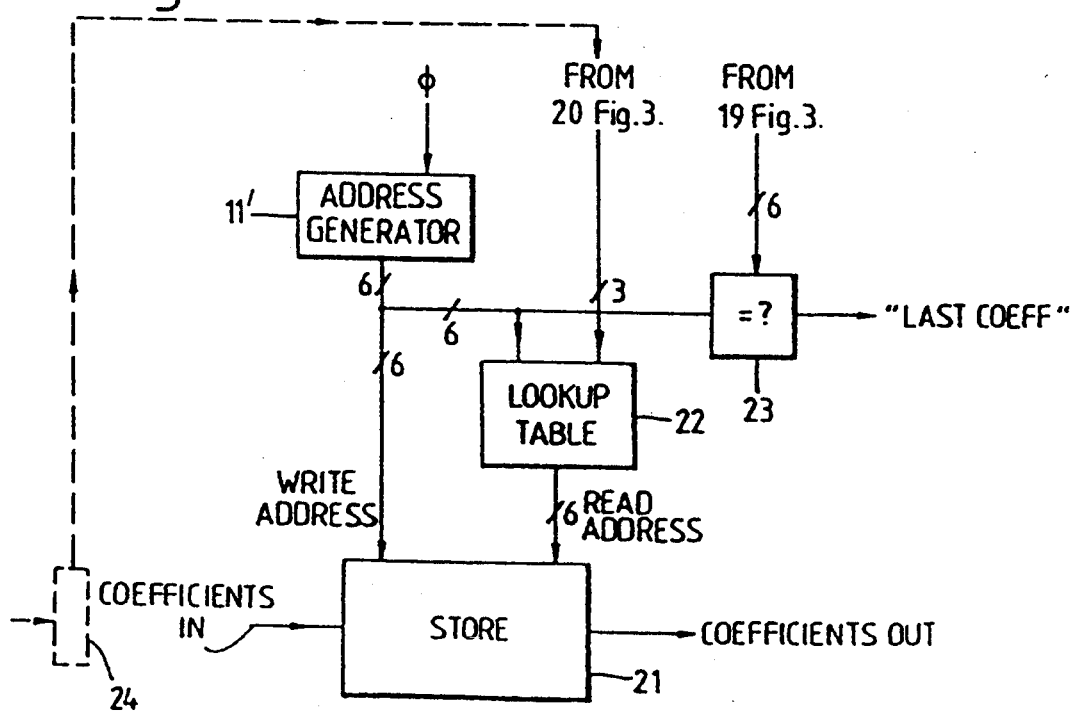

DATA ENCODING

This is a continuation of application Ser. No. 07/657,266, filed Feb. 19, 1991, now abandoned, which was in turn a continuation of Ser. No. 07/326,663, filed Mar. 3, 1989, now abandoned.

The present invention relates to an apparatus and method encoding a set of values—e.g. of transform coefficients in a video coder.

According to one aspect of the invention there is provided an apparatus of encoding a set of values, comprising:

assessment means for receiving the values in a first order and having a plurality of sections each arranged in accordance with a respective different predetermined order of the values to examine the values in the said first order, to identify, of those values which meet a predetermined criterion, which value occupies the highest position in the said respective predetermined order, and to produce an output indicating the position;

comparator means responsive to the output of the assessment means to identify that producing the lowest indicated position; and means for output of the values in the order corresponding to the identified assessment means.

In another aspect, the invention provides a method for encoding a set of values, comprising:

receiving the values in a first order;

examining the values in the said first order, to identify, of those values which meet a predetermined criterion, which value occupies the highest position in each of a plurality of predetermined orders of the values and to produce a signal indicating that position;

comparing the said signals to identify that one of the predetermined orders having the lowest indicated position; and producing, as output, the values in the order thus identified.

Other optional features of the invention are defined in the sub-claims.

One embodiment of the invention will now be described, by way of example, with reference to the accompanying drawings, in which:

FIG. 4 is a block diagram of the assessment means 12 of FIG. 3;

FIG. 5 is a block diagram of the resequencer 5 of FIG. 1; and

Figure 1:
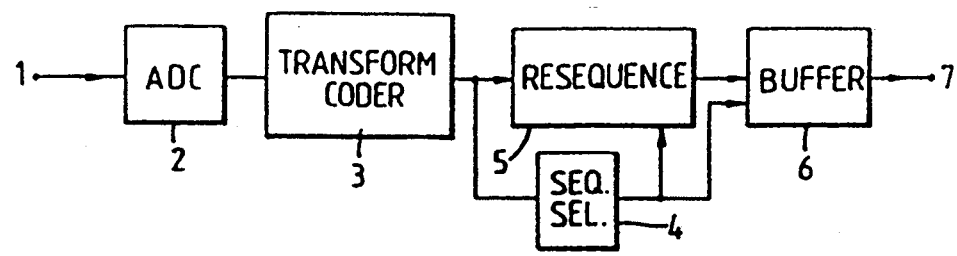
FIG. 1 is a block diagram of a coder.

The video coder shown in FIG. 1 has a video input 1, and an analogue to digital converter 2. This is followed by a transform coder 3. Each frame of the picture is notionally divided into blocks of picture elements (pixels) and each block subjected to a two-dimensional transform such as the discrete cosine transform (DCT) to produce a block of coefficients. One object of conversion into the transform domain is to effect a reduction in the quantity of data which needs to be encoded for transmission, since the number of bits used for encoding each coefficient can be tailored to the relative contribution of that coefficient to the picture quality. In particular, coefficients which are insignificantly small or zero need not be transmitted.

Other redundancy reduction techniques such as the use of inter-frame comparisons (before or after the transform coder) so that data needs to be transmitted only in respect of blocks which have changed between frames, differential coding, and the use of motion compensation, may also be employed if desired. However these, like transform coding itself, are well known in the picture coding field and will not be described further.

The transform coder output is supplied to a sequence selection unit 4, and a resequencer 5 which outputs the coefficients of a block in an order—determined by the unit 4—different from that in which they were received.

Figure 2:
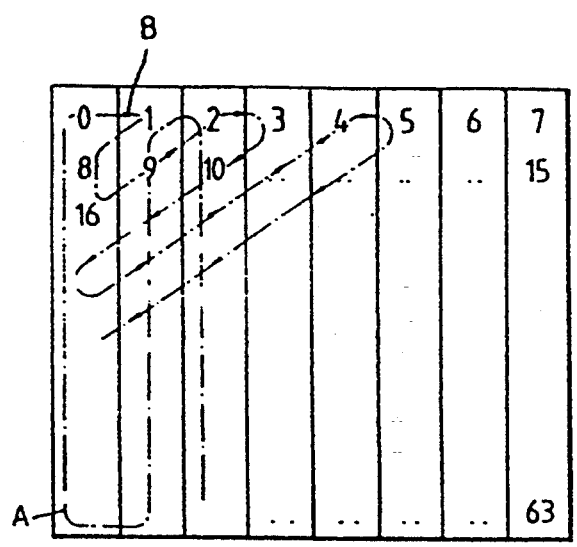
FIG. 2 illustrates a block of transform coefficients.

As previously mentioned, each frame (or field) of the picture is divided into blocks; for example 8 pixel×8 line blocks may be employed. After transformation, each block gives rise to an 8×8 block of coefficients, as illustrated schematically in FIG. 2 with the coefficients numbered (arbitrarily) 0 to 63. Conventionally (though not necessarily) these are represented as a matrix ordered as to sequency, the upper left coefficient (0) representing the mean level of brightness of the block (the "dc" coefficient) and coefficients increasing in horizontal and vertical sequency as one moves to the right or downwards. "Sequency" is the equivalent in the case of a discrete transform of frequency in the case of a continuous transform; the higher sequency coefficients carry information about the higher spatial frequency components of the picture. Generally these are smaller than the dc or lower sequency coefficients and commonly are more coarsely quantised before transmission. Some of these indeed may be zero and others may be so small as to be set to zero by a thresholding process.

In order to reduce the number of coefficients that require to be transmitted, it is proposed to vary the sequence in which the coefficients are transmitted, by defining a number—perhaps eight—of different orders of transmission. Two possible sequences are illustrated by arrowed lines A,B in FIG. 2. Once the last non-zero coefficient has been sent, transmission (for that block) can be terminated. The purpose of the selector 4 is to determine which order of transmission results in the maximum number of zeros at the end of the sequence, thereby minimising the number of coefficients that have to be sent.

Figure 3:
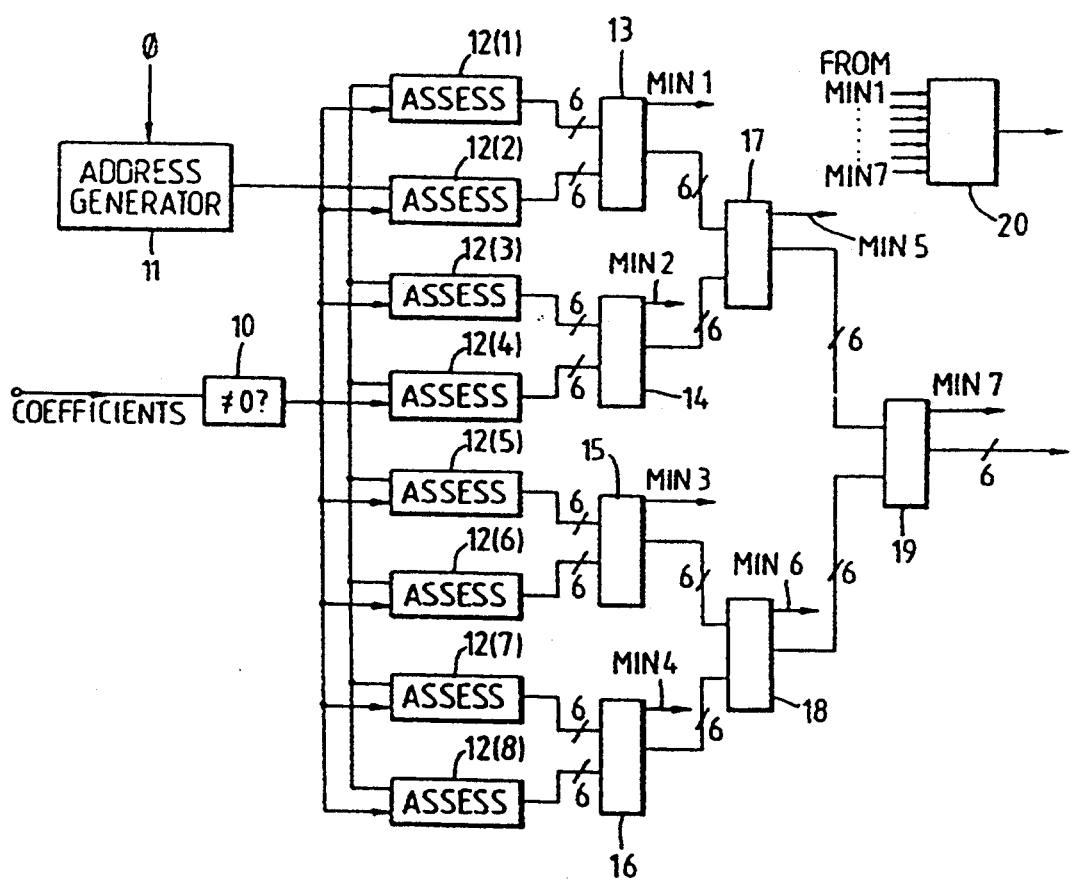
FIG. 3 is a block diagram of the sequence selector 4 of FIG. 1.

The selector 4 is shown in more detail in FIG. 3 and has an input to which a set of 64 coefficients for each block in turn are supplied by the transform coder 3. The processing of a single block will be described, it being understood that processing of subsequent blocks occurs in like manner.

An address generator 11 produces a sequence of 64 unique addresses synchronously with the appearance of the coefficients at the input. The sequence in which they appear is immaterial: for the purposes of further description it will be assumed that the generator is a 6-bit binary counter and addresses are the numbers shown in FIG. 2. Assessment means 12 serves to ascertain which of the eight possible orders is best suited to the transmission of the particular block. Each address in turn is passed to it, along with the corresponding coefficient, the latter via a circuit 10 which produces a '1' output if the coefficient is non-zero. The assessment means 12 has eight sections 12(1)–12(8), one of which is shown in FIG. 4.

The addresses, applied at input 121, pass to a look up table stored in a read-only memory 122. This stores the position, in the relevant one of the eight orders, of each coefficient—i.e. the output of the memory 122 is a translated address. For example, assuming order B of FIG. 2, address 10 represents the eighth coefficient of that order and therefore address 10 translates to 7.

As each translated address appears at the output of the memory 122 it is loaded into a latch 123 if
 (a) it is greater than the previous address stored in the latch
AND
 (b) the coefficient is non-zero.

For this purpose there is provided a comparator 124 which receives the outputs of the memory 122 and the latch 123 and produces a '1' output of the comparator and the output of the circuit 10 of FIG. 3 drive a load enable input of the latch 123 via an AND gate 127. After the address generator 11 has cycled through its 64 addresses, the content of the latch 123 (which is the output of the section) will be the largest translated address that is associated with a non-zero coefficient.

Each of the section 12(1)-12(8) is identical except for the content of the look up table 122 which corresponds in each case to a respective one of the eight orders—although if the order in which the coefficients were originally supplied is one of the eight, then one section could omit the table 122. When all 64 addresses have been scanned by the address generator, the outputs of the eight sections are compared to determined which is the lowest.

This function is performed by a comparator tree (FIG. 3) consisting of six read-only memories 13-19 each of which receives two addresses from assessment section outputs or an earlier such memory and produces as output the lower address. The outputs min1 ... min6 access a further read-only memory 20 to produce a code indicating which of the eight sections provided the lowest address, the address itself appearing at the output of the last stage 19 of the tree.

The resequencer 5 is shown in FIG. 5. (The address generator 11 is shown again for clarity). The coefficient selection operates in two phases, the first of which has been described above. During this first phase, the coefficients are stored in a store 21 with the aid of the address generator 11. In the second phase, the coefficients are read out from the store; for this purpose the address generator 11 again cycles through its sequence, as before, but the addresses generated pass to the store 21 via a read-only memory 22 containing eight translation tables each of which is the reverse of the contents of all eight stores 12(1)-12(8)—i.e. the generated address is interpreted as the position in the required order and the table provides the corresponding store address. Which of the eight tables is used is determined by the output of the read-only memory 20 which is applied to the higher order address lines of the memory 22. In this way the coefficients are read out in the selected order. The output of the comparator 19 is fed to a comparator 23 which produces a "last coefficient" pulse when the address generator reaches the address indicated. This pulse can be used to prevent the zero coefficients being entered into the output buffer 6 (FIG. 1) and hence to the output 7 of the coder.

In practice, for speed of operation, the two phases can be carried out simultaneously, the store 21 actually consisting of two stores one of which is being written to whilst the other is being read out.

Figure 6:
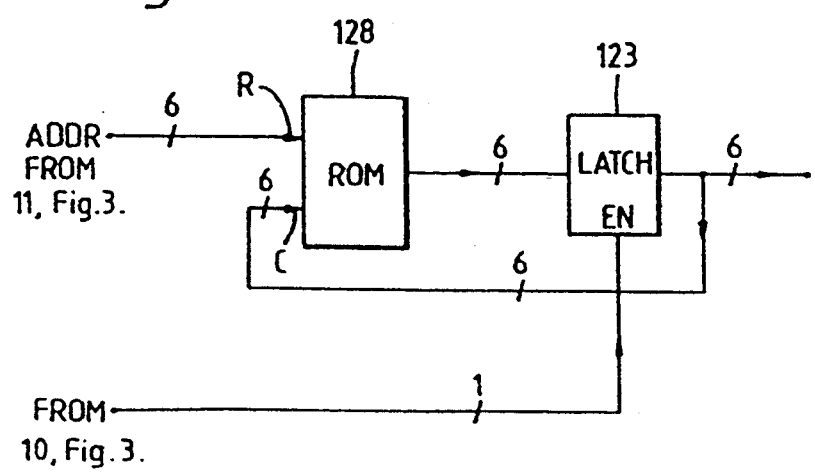
FIG. 6 is a block diagram of an alternative form of the assessment means 12 of FIG. 3.

FIG. 6 shows a modified version of the section shown in FIG. 4, in which the function of the lookup table 122 and comparator 124 are performed by a read-only memory 128. This may be regarded as having a row address R provided by the address generator 11 and column address C provided by the output of the latch 123. All locations having a translated row address greater than the column address contain the translated row address; other locations contain the column address.

The buffer 6 may be preceded by other coding arrangements such as a variable length coder.

In order to decode the transmitted sequence, it is necessary for a decoder to be informed of the transmission sequence used, and hence FIG. 1 shows the output of the sequence selector 4 connected to the output buffer 6, so that the sequence code output by the lookup table 20 of FIG. 3 is included in the transmitted data.

The number of coefficients sent ay be communicated explicitly (by transmitting also the output of the comparator 19) or implicitly—as is assumed below—by transmitting an end of run code following the last coefficient.

The circuit shown in FIG. 5 may also be used in a decoder. The received signal would first be preprocessed (not shown) by a variable length decoder or other means appropriate to the method of transmission used. Then the sequence code is stripped by an additional unit 24 (shown in broken lines) and supplied to the lookup table 22. The coefficients are entered into the store 21 by means of the address generator 11 (driven by suitable clock recovery means, not shown) and read out using the part of the lookup table 22 selected by the received sequence code. They may then be subjected to an inverse transform operation.

It will be appreciated that some or all of the functions of the coder sequence selector 4 and/or the resequencer 5 could if desired be performed by suitably programmed digital processing means.

A typical program listing in pseudo-language is set out below for the sequence selection. The first part of the 'ACTION' segment performs the same function as the assessment means in FIG. 3 and finds the position of the last non-zero coefficient in each scanning order. The second part examines these positions in turn to find the minimum and performs the same function as the tree structured comparators 13-20 in FIG. 3. The program assumes 64-element blocks, but any desired block size may of course be used.

```
SEQUENCE SELECTION PROGRAM
DECLARE:
VALUE (64)      Transform coefficient values
TABLE (n, 64)   Array of order tables for n sequences
HIGHEST (n)     Array to store highest position so far for
                each sequence
SEQ             Sequence counter
COEFF           Coefficient counter
TEMP            Workspace register
BEST            Workspace register
END DECLARE
ACTION:
FOR COEFF = 1 TO 64
    IF VALUE (COEFF) = 0
        NO ACTION
    ELSE
        FOR SEQ = 1 TO n
            TEMP = TABLE (SEQ, COEFF)
            IF TEMP > HIGHEST (SEQ)
                HIGHEST (SEQ) = TEMP
            ELSE
                NO ACTION
            END IF
        NEXT SEQ
```

```
-continued
SEQUENCE SELECTION PROGRAM
    END IF
  NEXT COEFF
  BEST = 1
  TEMP = HIGHEST (1)
  FOR SEQ = 2 TO n
    IF HIGHEST (SEQ) < TEMP
      BEST = SEQ
      TEMP = HIGHEST (SEQ)
    ELSE
      NO ACTION
    END IF
  NEXT SEQ
END ACTION
(Selected Sequence now indicated by BEST and number of
coefficients to be sent is in TEMP).
```

We claim:

1. An apparatus for encoding a set of values, comprising:

assessment means for receiving the values in a first order and having a plurality of sections, each said section operating concurrently with each other said section and each said section including means to examine the values, means to identify, of those values which meet a predetermined significance criterion, which value occupies the highest position in each respectively associated predetermined order, and means to produce outputs indicating that position within such predetermined order;

comparator means responsive to the outputs of the assessment means to identify that section having the lowest indicated said position thereby determining which of the predetermined orders provides the largest end-run of values not meeting the predetermined significance criterion; and means for output of the values in the predetermined order corresponding to the thus identified section of the assessment means having the lowest indicated position.

2. An apparatus according to claim 1 further comprising address generating means arranged to generate a sequence of reference addresses and apply them to the assessment means and to the means for output of the values.

3. An apparatus for encoding a set of values, comprising:

assessment means for receiving the values in a first order and having a plurality of sections, each said section including means to examine the values, means to identify, of those values which meet a predetermined criterion, which value occupies the highest position in each respectively associated predetermined order, and means to produce outputs indicating that position within such predetermined order;

comparator means responsive to the outputs of the assessment means to identify that section having the lowest indicated said position;

means for output of the values in the predetermined order corresponding to the thus identified section of the assessment means having the lowest indicated position;

address generating means arranged to generate a sequence of reference addresses and apply them to the assessment means and to the means for output of the values;

in which each section of the assessment means includes a look-up table responsive to a generated address to provide a translated address representing a corresponding position in its respective one of said predetermined orders and a latch for storing one address, and where said section is arranged to store in its latch any translated address which exceeds the current content of the latch in the event that the value associated with such address meets the predetermined criterion.

4. An apparatus according to claim 3 in which each section of the assessment means has a comparator for comparing each translated address with the content of the relevant latch.

5. An apparatus according to claim 3 in which, in each section of the assessment means, the look-up table is responsive both to the generated addresses and the address stored in the latch to produce as output the generated address or the address stored in the latch according to whether the generated address is respectively greater than or not greater than the address stored in the latch, and the latch is connected to be loaded with that output whenever the associated value meets the predetermined criterion.

6. An apparatus for encoding a set of values, comprising:

assessment means for receiving the values in a first order and having a plurality of sections, each said section including means to examine the values, means to identify, of those values which meet a predetermined criterion, which value occupies the highest position in each respectively associated predetermined order, and means to produce outputs indicating that position within such predetermined order;

comparator means responsive to the outputs of the assessment means to identify that section having the lowest indicated said position;

means for output of the values in the predetermined order corresponding to the thus identified section of the assessment means having the lowest indicated position;

address generating means arranged to generate a sequence of reference addresses and apply them to the assessment means and to the means for output of the values;

in which the output means comprises a store operable to store the values in locations determined by the generated reference sequence of addresses and to retrieve the values in a sequence determined by a look-up table controlled by the assessment means.

7. An apparatus according to claim 1 in which the predetermined criterion is that the value is more than a set threshold.

8. An apparatus according to claim 7 in which the predetermined criterion is that the value is non-zero.

9. An apparatus according to claim 1 in which the output means is arranged to output values only up to the said lowest indicated position.

10. A video coder comprising transform coding means and an apparatus according to claim 1 for encoding sets of values representing transform coefficients.

* * * * *